No. 735,038.

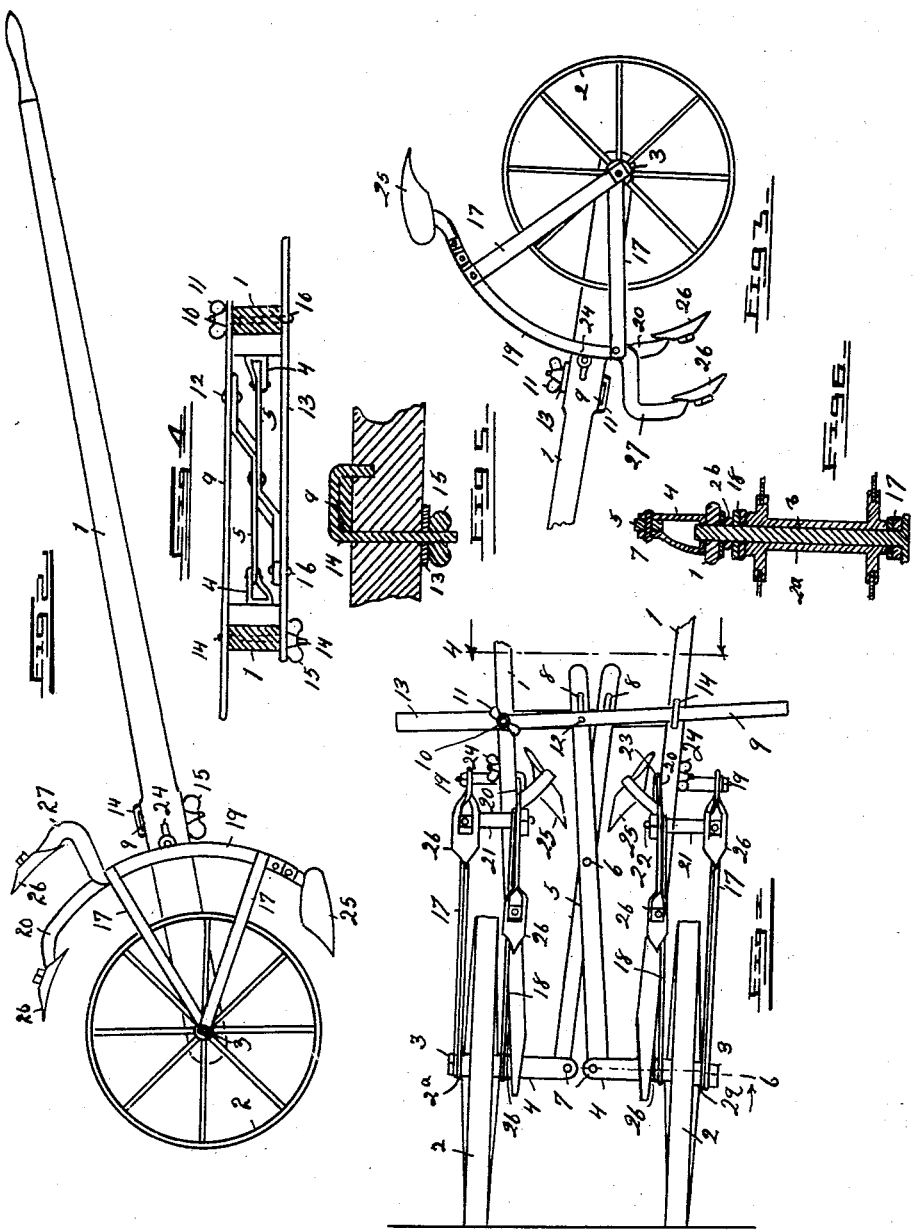

Patented July 28, 1903.

UNITED STATES PATENT OFFICE.

DELMER H. MOORE, OF GREENVILLE, MICHIGAN, ASSIGNOR TO THE MOORE PLOW AND IMPLEMENT COMPANY, OF GREENVILLE, MICHIGAN.

GARDEN-CULTIVATOR.

SPECIFICATION forming part of Letters Patent No. 735,038, dated July 28, 1903.

Application filed November 22, 1902. Serial No. 132,361. (No model.)

*To all whom it may concern:*

Be it known that I, DELMER H. MOORE, a citizen of the United States, residing at Greenville, in the county of Montcalm, State of Michigan, have invented certain new and useful Improvements in Garden-Cultivators; and I do declare the following to be a full, clear, and exact description of the invention, such as will enable others skilled in the art to which it appertains to make and use the same, reference being had to the accompanying drawings, and to the figures of reference marked thereon, which form a part of this specification.

This invention relates to a garden-cultivator; and it consists in the construction and arrangement of parts hereinafter fully set forth, and pointed out particularly in the claims.

The objects of the invention are to provide simple and efficient means for cultivating on both sides of a row of plants, for adjusting the cultivator to obtain any desired width between the transporting-wheels and rigidly connecting the adjustable parts, and to provide a double set of cultivating-tools, either set of which may be brought into use by simply reversing the implement.

A further object is to provide specific features of construction whereby simplicity and cheapness are attained.

The above objects are accomplished by the construction illustrated in the accompanying drawings, in which—

Figure 1 is a plan view of my improved cultivator, the handles being broken away. Fig. 2 is a side elevation of the cultivator. Fig. 3 is also a side elevation, but showing the cultivator reversed, so as to bring into operation a different set of tools from those in operation in Fig. 2. Fig. 4 is a transverse section on line 4 4 of Fig. 1. Fig. 5 is an enlarged fragmentary view in section through a portion of one of the handles, showing the L-shaped clamping-bolt adapted to secure one of the transversely-adjustable bars which unite the handles in a manner to permit of their lateral movement. Fig. 6 is an enlarged transverse section on line 6 of Fig. 1.

Referring to the characters of reference, 1 designates the handles, whose outer ends diverge sufficiently to allow the operator to walk between them. The transporting-wheels 2 are journaled upon axle-bolts 3, which pass through the hubs $2^a$ of said wheels and through the interposed nuts $2^b$ and the forward ends of the handles, the inner ends of said bolts screwing into the brackets 4, which project inwardly from the handles, as shown in Fig. 1, affording a very simple and inexpensive means for journaling the wheels upon the handles and maintaining them in position. The axle-bolts of the transporting-wheels being independent, said wheels are therefore allowed to move laterally toward and from each other. To connect the transporting-wheels in a manner to permit of their adjustment, the crossed levers 5 are employed, which are pivoted together at their point of crossing, as at 6, and at their forward ends are pivoted at 7 to the brackets 4. The rear ends of the levers 5 are provided with longitudinal slots 8 and are bent upwardly and downwardly, respectively, to cause them to stand apart. Lying upon the upper face of the handles and crossing between them is a transverse bar 9, one end of which is pivoted on the upper end of the L-bolt 10, which receives the thumb-nut 11. Passing through the bar 9 is a pin 12, which lies in the slot 8 of the upper lever 5, whereby said lever becomes attached to said bar. Mounted upon the under face of the handles is a transverse bar 13, which is pivoted to one of the handles upon the L-bolt 14, which passes therethrough and receives the thumb-nut 15. The angle portion of the bolt 14 forms a loop which embraces the bar 9 in a manner to allow said bar to slide therethrough when the nut 15 is loosened, but which affords means for securely clamping the bar 9 upon the tightening of said nut. In like manner the angle portion of the bolt 10 embraces the lower bar 13, whereby said bars may be allowed to slide through the loops of said bolts, respectively, when the thumb-nuts of the bolts are loosened, but are securely clamped to said bolts by the tightening of said nuts, forming of said bars a bridge or truss between the handles, which rigidly unites them after they have been properly adjusted. Passing through the bar 13 is a pin 16, which engages in a slot 8 of the lower lever 5, thereby establishing a slidable connection between said lever and bar 9, as between the bar 9 and the upper lever 5. By this arrangement it will be seen that upon loosening the thumb-nuts 11 and 15 the handles 1 may be separated, thereby actuating the levers 5 to separate the transporting-wheels, allowing said wheels to be adjusted, as desired, to pass upon each side of a row of plants. When properly adjusted, the parts are securely clamped in place by tightening said nuts. Should it be desired to reduce the distance between the transporting-wheels, the handles may be brought together after the nuts 11 and 15 have been loosened, thereby operating the crossed levers 5 to move the transporting-wheels closer together, as will be well understood. The slots 8 in the crossed levers in these operations allow of a movement of the connecting-pins 12 and 16 therein, as the bars 9 and 13 are adjusted transversely.

Mounted upon the axle-bolts upon each side of the hubs of the transporting-wheels are the radial arms 17 and 18. Attached to the outer ends of these arms are the opposed circle-bars 19 and 20. Interposed between the opposite ends of said circle-bars are the sleeves 21, through which pass the tie-bolts 22, whereby said bars are coupled together. The inner bars 20 pass the face of the handles 1 and are adjustably secured thereto by the L-shaped clamping-bolts 23, which pass through the handles and receive on their outer ends the thumb-nuts 24. Upon the opposite ends of the circle-bars are attached the plows 25 and the cultivating-shovels 26, the outer circle-bars 19 at one end being bent rearwardly, as shown at 27, so as to arrange the shovels tandem. By loosening the nuts 24 the circle-bars may be swung upon the axles of the transporting-wheels to enable the handles to be raised or lowered to suit the height of the operator. By this arrangement an implement is provided which enables the use of two sets of tools by simply reversing the handles, as illustrated in Figs. 2 and 3, bringing into use the shovels 26 or the plows 25, as desired. It will also be understood that the tools shown may be replaced by others of different character, so as to adapt the implement for any desired use. The lateral adjustment of the transporting-wheels also adjusts laterally the working tools carried by the implement, so that when the wheels are adjusted to increase or decrease the distance between them the tools are in like manner adjusted.

The comparatively simple construction and ready adjustment of the implement herein shown renders it highly efficient as a garden-cultivator.

Having thus fully set forth my invention, what I claim as new, and desire to secure by Letters Patent, is—

1. In a garden-cultivator, the combination of the opposed laterally-movable handles, the transporting-wheels journaled to said handles respectively, transverse connecting-bars, said bars being pivoted at their opposite ends to said handles, and having a slidable engagement with the handle opposite to that to which they are pivoted, crossed levers pivoted at their point of crossing, the forward ends of said levers being pivoted to the axle-bolts of the transporting-wheels, the rear ends of said levers having slidable connection with the transverse bars extending between the movable handles.

2. In a garden-cultivator, the combination of the laterally-movable handles, adjustable connections between said handles, transporting-wheels journaled to the forward ends of said handles, and laterally movable therewith, means connecting the journals of each of said wheels with the handle opposite thereto whereby a movement imparted to the handles is imparted to the axis of the wheels, circle-bars adjustably mounted upon each of said handles, cultivating-tools attached to said circle-bars, and means for clamping said circle-bars to the handles.

3. In a garden-cultivator, the combination of the laterally-movable handles, the transporting-wheels, said handles attached to the axle-bolts of said wheels, brackets projecting inwardly from said axle-bolts, crossed levers having their forward ends pivoted to said brackets, said levers being pivoted together at their point of crossing and having slots in their rear ends, transverse bars carrying pins which engage in the slots of said levers, means for clamping said bars to said handles to lock them against movement, adjustable circle-bars mounted on the axle of the wheels carrying cultivating-tools, and means for locking said circle-bars.

4. In a cultivator, the combination of the laterally-movable handles, the transporting-wheels, axle-bolts passing through the hubs of said wheels, the inner ends of said bolts passing through the handles, brackets into which the inner threaded ends of the axle-bolts are screwed, adjusting-levers pivoted to the brackets, and means connecting said adjusting-levers with the handles.

In testimony whereof I sign this specification in the presence of two witnesses.

DELMER H. MOORE.

Witnesses:
 E. S. WHEELER,
 M. C. POOLE.